United States Patent [19]

Weber et al.

[11] Patent Number: 5,280,772
[45] Date of Patent: Jan. 25, 1994

[54] PROCESS FOR CONTROLLING THE SPEED OF AN INTERNAL COMBUSTION ENGINE AFTER STARTING

[75] Inventors: Gerald Weber, Wenzenbach; Stefan Krebs, Regensburg, both of Fed. Rep. of Germany

[73] Assignee: Siemens Aktiengesellschaft, Munich, Fed. Rep. of Germany

[21] Appl. No.: 910,103

[22] PCT Filed: Jun. 11, 1991

[86] PCT No.: PCT/EP91/01084
§ 371 Date: Jul. 6, 1992
§ 102(e) Date: Jul. 6, 1992

[87] PCT Pub. No.: WO91/19901
PCT Pub. Date: Dec. 26, 1991

[30] Foreign Application Priority Data

Jun. 12, 1990 [EP] European Pat. Off. ........ 90111112.0

[51] Int. Cl.$^5$ .................................................. F02M 3/00
[52] U.S. Cl. ................................................. 123/339
[58] Field of Search .............. 123/339, 421, 417, 424, 123/352; 74/873

[56] References Cited

U.S. PATENT DOCUMENTS

| 4,338,899 | 7/1982 | Geiger et al. | 123/339 |
|---|---|---|---|
| 4,351,297 | 9/1982 | Suematsu | 123/421 |
| 4,378,770 | 4/1983 | Ikeura | 123/424 |
| 4,399,789 | 8/1983 | Yano | 123/340 |
| 4,416,234 | 11/1983 | Ikeura | 123/424 |
| 4,432,325 | 2/1984 | Auracher et al. | 123/424 |
| 4,445,477 | 5/1984 | Ikeura | 123/416 |
| 4,570,596 | 2/1986 | Sato | 123/421 |
| 4,633,834 | 1/1987 | Takeuchi et al. | 123/424 |
| 5,036,812 | 8/1991 | Fukui et al. | 123/339 |
| 5,083,541 | 1/1992 | Chen | 123/339 |
| 5,133,319 | 7/1992 | Ikeda et al. | 123/339 |
| 5,172,666 | 12/1992 | Nonaka | 123/352 |
| 5,191,865 | 3/1993 | Minamitani et al. | 123/339 |
| 5,199,326 | 4/1993 | Iwatsuki et al. | 123/339 |
| 5,199,400 | 4/1993 | Sprenger et al. | 123/339 |

FOREIGN PATENT DOCUMENTS

| 0051723 | 5/1982 | European Pat. Off. | 123/339 |
|---|---|---|---|
| 3924756 | 2/1990 | Fed. Rep. of Germany | 123/339 |
| 2427477 | 12/1979 | France | 123/339 |
| 2454526 | 11/1980 | France | 123/339 |
| 2454532 | 11/1980 | France | 123/339 |
| 2454535 | 11/1980 | France | 123/339 |
| 2477642 | 9/1981 | France | 123/339 |
| 2612256 | 9/1988 | France | 123/339 |

Primary Examiner—Raymond A. Nelli
Attorney, Agent, or Firm—Hill, Steadman & Simpson

[57] ABSTRACT

In a process for controlling the speed of an internal combustion engine after starting, the ignition angle (ZW) is adjusted in the retarded direction when an engine speed threshold (nS) is reached, in order to reduce the power and to reach the idling speed (nLL) without overshooting. The engine speed threshold (nS) is dependent on the temperature-dependent idling speed (nLL). The degree of ignition angle adjustment (Z) is dependent on the rate of variation of the engine speed.

6 Claims, 2 Drawing Sheets

PROCESS FOR CONTROLLING THE SPEED OF AN INTERNAL COMBUSTION ENGINE AFTER STARTING

BACKGROUND OF THE INVENTION

The invention relates to a process for controlling the speed of an internal combustion engine after starting, and until reaching an idling speed.

The starting process is terminated when the engine which has been disconnected from the starter continues to run under its own power and has reached a specific minimum speed. After this, the so-called after-start phase begins, during which the engine runs up to its predetermined idling speed. This idling speed is usually controlled in modern engine controls by means of an idling speed regulator.

During this after-start phase, there is still no stable operating state present. The speed usually increases very rapidly within approximately 0.3 to 1 second, from approximately 200 revolutions per minute after the start, to the temperature-dependent idling speed of approximately 600 revolutions per minute at approximately 20° C. A slightly enriched mixture adjustment and early ignition angle values are usually provided here in order to ensure reliable running up.

However, the rapid increase in speed also causes the speed firstly to rise beyond the predetermined idling speed and only then to be subsequently controlled back to the idling speed by the idling speed regulator. As a result of this overshooting of the speed over the idling speed, increased exhaust gas emissions arise which are in any case already increased by the rich mixture setting and therefore by the not yet possible lambda control during the after-start phase.

SUMMARY OF THE INVENTION

The invention is therefore based on the object of avoiding this overshoot with the associated higher exhaust gas emissions without thereby adversely affecting the reliable running up of the engine.

In general terms the present invention is a process for controlling the speed of an internal combustion engine after starting and until reaching an idling speed. The speed of the internal combustion engine is continuously detected and the idling speed is dependent on the cooling water temperature. Starting from a specific engine speed threshold, the ignition angle is adjusted in the retarded direction as a function of the rate of change of the speed for a specific time period. After this time period has elapsed the ignition angle is adjusted back to the normal ignition angle in accordance with a predetermined function.

The following are advantageious developments of the present invention. An idling speed control can be provided which adjusts the engine speed of the idling speed. The engine speed threshold can be dependent on the idling speed. The return control function can be linear or the return control function can be progressive. A still existing adjustment in the retarded direction of the ignition angle can be reversed if the idling operating state is departed from.

The invention is based on the recognition that the degree of overshoot is dependent on the rate of variation of the speed, that is to say on the acceleration during the starting phase. Therefore, the higher this rate of variation of the speed the greater is the degree of intervention that is necessary. However, each such intervention unavoidably causes the running of the motor to be impaired, since a power limitation must take place in some form or another although, particularly during the after-start phase, this power is necessary for reliable operation of the engine. Therefore, according to the invention, the power is reduced only above a specific engine speed threshold. This engine speed threshold is determined individually for each engine type during driving trials so that, on the one hand, the engine no longer dies, and on the other hand, the overshooting of the speed can still be avoided. The intervention consists of abruptly adjusting the ignition angle in the retarded direction above this engine speed threshold, as a function of the rate of charge of the engine speed and controlling it back to the ignition angle, which is normal for the idling speed, only after a specific time period has elapsed. The time period and the return control function are also optimised in this case by means of starting trials in such a way that a shortest possible adjustment time to the idling speed is obtained.

In accordance with a preferred embodiment of the invention, the engine speed threshold is a function of the temperature-dependent idling speed. This is the case because at low temperatures the engine speed threshold, which still permits reliable continued operation of the engine, despite power limiting is also at a correspondingly higher level than at lower temperatures.

The return control function for the late ignition angle back to the normal ignition angle can be preferably linear or progressive, as desired. In this way a jolt is avoided which would occur in the case of an abrupt change in the ignition angle.

If the driver presses on the accelerator during the after-start phase, and therefore the idling speed control range is departed from, the adjustment of the ignition angle in the retarded direction is also, immediately terminated since the complete power of the engine is then needed.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, and in which:

DESCRIPTION OF THE PREFERRED EMBODIMENT

Figure 1:
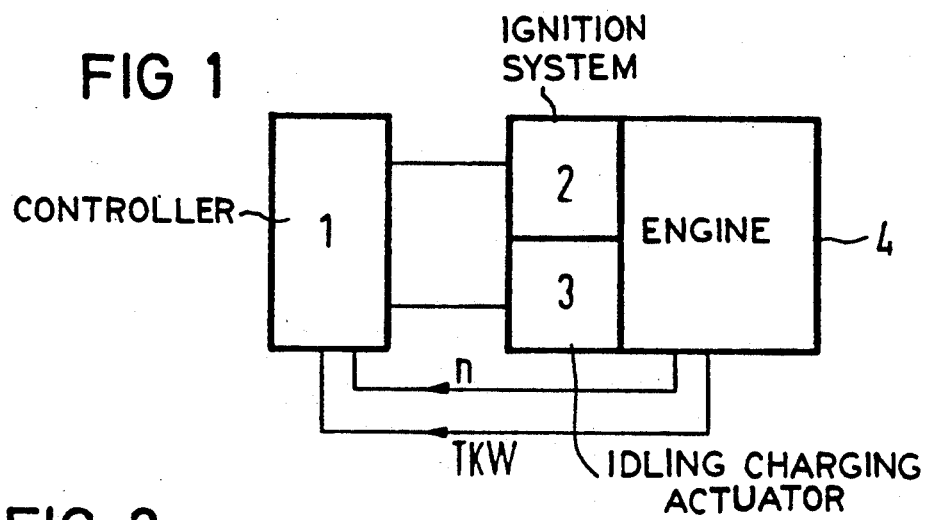
FIG. 1 shows a simplified block diagram of an internal combustion engine with an engine control for carrying out the method according to the invention and FIGS. 2, 3 show an engine speed/time diagram or a ignition angle/time diagram for explaining the method.

In FIG. 1, 1 designates an engine controller. The engine controller 1 is a customary microcomputer system with corresponding input and output interfaces. In order to carry out the method according to the invention, it receives from appropriate sensors the engine speed n and the cooling water temperature TKW of an internal combustion engine 4 as input variables.

The engine controller 1 controls an ignition system 2 and an idling charging actuator 3 via its output interfaces.

The engine controller 1 carries out idling speed control by means of the idling charging actuator 3. The actual value here is the engine speed n measured on the internal combustion engine 4. The desired value which is to be set is dependent on the operating temperature. This operating temperature is measured indirectly via the cooling water temperature TKW. The dependence of the idling speed nLL on the cooling water temperature TKW is stored in, a characteristic diagram in the engine controller 1 in a read-only memory.

Figure 2:
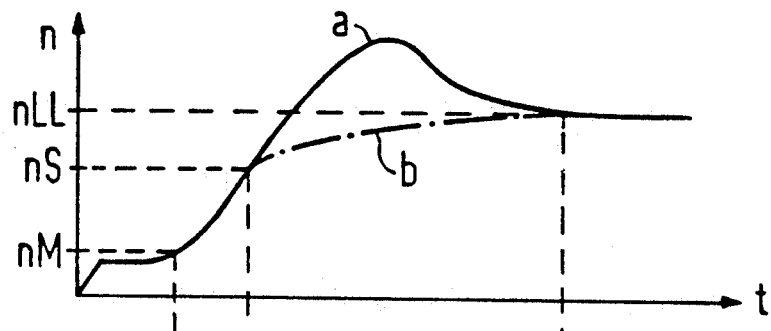

In the diagram in FIG. 2, the speed n is illustrated against time t starting with the starting process of an internal combustion engine. When the internal combustion engine starts, it is initially turned by the starter. After the engine begins to turn independently and a minimum engine speed nM is reached, the start is terminated and the after-start phase follows.

During this after-start phase, the internal combustion engine runs up to its usual idling speed nLL. The rate of variation of the engine speed is dependent on the ambient conditions, in particular the temperature. After the idling speed nLL is exceeded, the idling speed control intervenes in order to set the engine speed to the idling speed nLL by correspondingly actuating the idling charging actuator 3.

This is illustrated in FIG. 2 by means of the curve a. The degree of overshooting of the engine speed characteristic which occurs here beyond the idling speed nLL is dependent on the level of engine speed variation.

Figure 3:
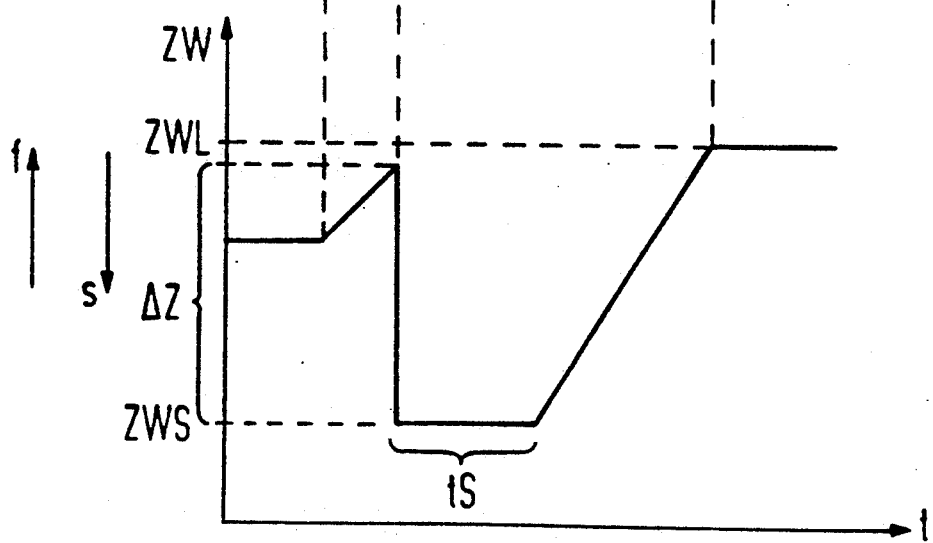

In order to avoid this overshooting, the ignition angle ZW is adjusted in the retarded direction starting from an engine speed threshold nS. In FIG. 3, the ignition angle ZW is entered against time t. During the start, the ignition angle ZW is constant and is then continuously adjusted in the advanced direction during the after-start phase with increasing engine speed n. When the engine speed threshold nS is reached, an abrupt adjustment in the retarded direction follows. This new later ignition angle ZW is maintained during a time period tS and then controlled back to the normal idling ignition angle ZWL.

By means of the adjustment in the retarded direction at the engine speed threshold nS, the power of the internal combustion engine is reduced so that the engine speed characteristic flattens out in accordance with the curve designated in FIG. 2 by b. The time period tS for the maintenance of the later ignition angle ZWS and the linear return control function to the idling ignition angle ZWL are determined by starting trials, and are selected in such a way that the idling speed nLL is achieved as quickly as possible and with as few jolts as possible. For jolt-free transition, the speed regulation function can also be progressively or specially adapted depending on the internal combustion engine.

Figure 4:
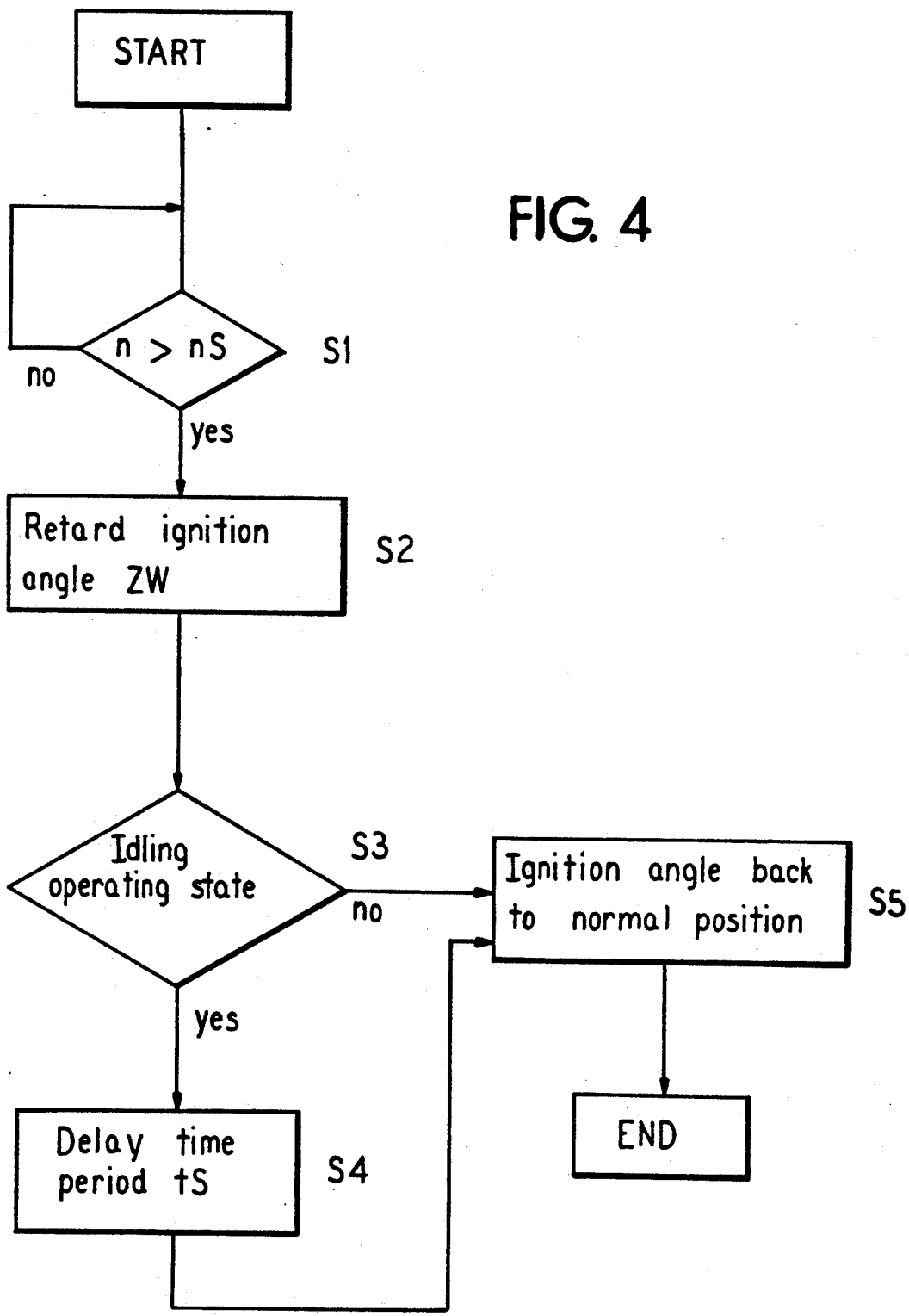
FIG. 4 shows a flowchart which describes in general the method according to the present invention.

FIG. 4 shows the method of the present invention in the form of a flowchart. During the start the ignition angle ZW is constant and is then continuously adjusted in the advanced direction during the after-start phase with increasing engine speed n. According to step S1 when the engine speed threshold nS is reached, an abrupt adjustment in the retarded direction follows (step S2). In step S3 it is determined whether or not the engine is in the idling operating state. If not, the ignition angle is adjusted back to the normal position (step S5). If the engine is in the idling operating state the ignition angle ZW is held in the retard position for a time period tS (step S4). After this time period it is controlled back to the normal position.

The engine speed threshold nS at which the intervention takes place is dependent on the idling speed nLL. This idling speed nLL is also temperature-dependent in carburettor engines and is taken from a characteristic diagram in internal combustion engines with idling speed control as a function of the cooling water temperature TKW. Since the engine speed threshold nS is referred to this idling speed nLL, which is variable as a function of temperature, the ignition angle intervention therefore also takes place variably at different engine speeds n as a function of temperature. As a result, it is ensured for each cooling water temperature TKW that, on the one hand, the internal combustion engine continues to operate reliably and, on the other hand, that overshooting is avoided.

The size of the ignition angle change $\Delta Z$ is dependent on the rate of variation of the speed. With a correspondingly steep rise of the engine speed characteristic and thus of the rate of variation, the ignition angle change $\Delta Z$ is correspondingly large in order to reduce power sufficiently. On the other hand, with an extremely slow rise of the engine speed characteristic, it may even be the case that possibly no ignition angle change at all is necessary. The magnitude of the ignition angle change as a function of the rate of variation of the speed is in turn stored in a characteristic diagram.

For a specific internal combustion engine, values of 0° to 15° in the retarded direction were determined for this ignition angle change $\Delta Z$. At 300 revolutions per minute, the engine speed threshold nS was below the idling speed nLL. The time periods tS was selected in such a way that the constant retarded ignition angle was maintained for two to three ignitions. The increments for the linear return control function were configured in such a way that the return control was terminated after approximately five firings.

The intervention is terminated when the normal idling ignition angle ZWL is reached again. In addition, the intervention is terminated whenever the idling speed control range is departed from. This is the case when the driver presses the accelerator and thus the entire power of the internal combustion engine is needed.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A process for controlling the speed of an internal combustion engine after starting until reaching an idling speed the speed of the internal combustion engine being continuously detected, and the idling speed being dependent on the temperature of cooling water in the engine, comprising the steps of:

detecting, during an after-start phase, that the speed of the internal combustion engine has exceeded a specific engine speed threshold, adjusting the ignition angle in a retarded direction as a function of a rate of variation of the speed for a specific time period, and after this time period has elapsed adjusting the ignition angle back to a normal ignition angle in accordance with a predetermined function.

2. The process as claimed in claim 1, wherein an idling speed control is provided which adjusts the speed of the engine to the idling speed.

3. The process as claimed in claim 2, wherein the engine speed threshold is dependent on the idling speed.

4. The process as claimed in claim 2, wherein the adjusting of the ignition angle back to the normal ignition angle is linear.

5. The process as claimed in claim 2, wherein the adjusting of the ignition angle back to the normal ignition angle is progressive.

6. The process as claimed in claim 1, wherein a still existing adjustment in the retarded direction of the ignition angle is reversed if the idling operating state is departed from.

* * * * *